May 5, 1925.
H. B. HARTMAN ET AL
EDUCTOR
Filed Dec. 27, 1922
1,536,180
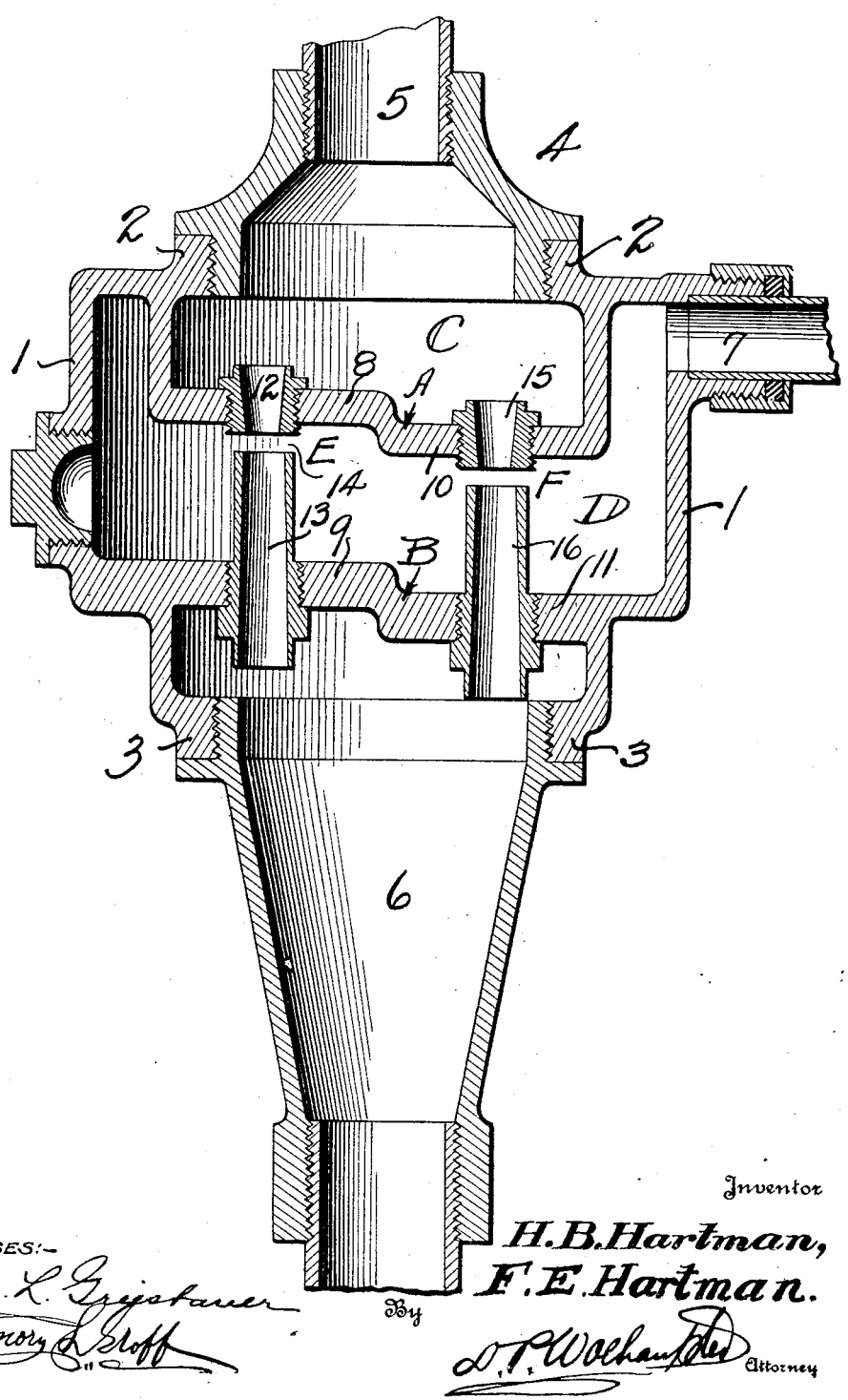
Inventor
H. B. Hartman,
F. E. Hartman.
WITNESSES:—

Patented May 5, 1925.

1,536,180

UNITED STATES PATENT OFFICE.

HARRY BUXTON HARTMAN AND FRANK EDWARD HARTMAN, OF SCOTTDALE, PENNSYLVANIA, ASSIGNORS TO ELECTRIC WATER STERILIZER & OZONE COMPANY, OF SCOTTDALE, PENNSYLVANIA, A CORPORATION OF PENNSYLVANIA.

EDUCTOR.

Application filed December 27, 1922. Serial No. 609,349.

*To all whom it may concern:*

Be it known that we, HARRY B. HARTMAN and FRANK E. HARTMAN, citizens of the United States, residing at Scottdale, in the county of Westmoreland and State of Pennsylvania, have invented certain new and useful Improvements in Eductors, of which the following is a specification.

This invention relates to a novel improvement in eductors particularly intended for use in connection with ozone water purifying apparatus.

A primary object of the invention is to provide a low pressure liquid operated eductor involving novel features of construction and operating upon a principle which is more or less a departure from the principles now embodied in devices of a similar type.

It is a well known fact that heretofore, all devices of this character have been based upon the principle of the vacuum created by the vena contracta of a stream of liquid issuing from a divergent tube and governed by the type of orifice employed and the head of pressure under which the liquid is delivered. The character of the suction set up by such conditions must, of a necessity, be intermittent, as the gas propelled forward must cease as soon as the vacuum is filled, and a new vacuum must be set up before the gas will again flow. A new vacuum cannot be set up until the body of liquid forming the vena contracta has passed into a lower plane, and been replaced by other liquid which in turn takes up the task of entraining the gas. Furthermore, the capacity of an eductor constructed as above indicated must be limited to the volume of the space left between the plane parallel with the edge of the orifice and the sides of the frustrum formed by the issuing jet, and may be rated as this volume multiplied by the unit of time required for the complete formation of a second vena contracta.

Therefore, the ordinary type of eductor is both limited in capacity and intermittent or irregular in its action so far as concerns continuously bringing the proper volume of gas into contact with the liquid. That is to say, the ordinary type of eductor is limited in its ability to shift gases or liquids in the unit of time necessary for the formation of a second vena contracta because, immediately after the initial vacuum has been filled, the passage of gas ceases and therefore remains at rest until the second vacuum has been created. This causes the gases or liquids to be intermittent or pulsating in their passage and is a distinct disadvantage when the gas is introduced with a view to thoroughly mixing it with the liquid.

Accordingly, it is the purpose of the present invention to obviate as far as possible such intermittent action in order that the gas may be continuously and uniformly mixed with the liquid, which is necessary in the case of water purification to insure adequate contact of the ozone with the water to obtain the proper degree of purification. The necessity of uniform gas flow can be appreciated when it is considered that the velocity of such effluxes is at the rate of from 10 to 35 feet per second, according to the head employed, and the lapse of a fraction of a second in the flow of gas will allow quite a volume of liquid to pass unmixed with the gas.

A further and more specific object of the invention is to provide an eductor having a plurality of nozzles arranged at different levels thereby to throw the action thereof out of phase or synchronism so that when one nozzle is in the act of entraining gas the other has not yet discharged its liquid, and vice versa, thus preventing the gas from coming to a state of rest and insuring continuous entrainment of the gas with the liquid.

A further object of the invention is to utilize nozzles which are of greatly reduced diameter in comparison with the size of the pipes supplying them with fluids, whereby they function in the manner of capillaries, resulting in the advantages hereinafter pointed out, and also permitting of operation on pressures much lower than those required by the ordinary type of eductor.

With the above and other objects in view which will more readily appear as the nature of the invention is better understood the same consists in the novel construction, combination and arrangement of parts hereinafter more fully described, illustrated and claimed.

A preferred and practical embodiment of the invention is shown in the accompanying drawings, in which:—

The figure is a vertical sectional view of the improved eductor.

Similar reference characters designate corresponding parts throughout the several figures of the drawings.

The present device is particularly adapted for use in connection with water purifying apparatus, and an example of the use thereof is illustrated in my co-pending applications Serial No. 506,543 filed October 10, 1921 and Serial No. 592,817 filed October 6, 1922.

In the embodiment of the invention shown in the drawing the same preferably consists of a hollow body 1 having the upper and lower threaded openings 2 and 3, respectively for receiving the adapter 4 for the water inlet pipe 5 and the conical delivery pipe 6 for the combined liquid and gas. The said hollow body 1 is preferably formed with the spaced interior walls designated generally as A and B, which provide a water chamber C in the upper part of the body and the relatively capacious ozone chamber D in the middle thereof, the latter being provided with an ozone inlet connection 7 communicating with an ozone generator or other source of ozone supply.

As previously indicated, one of the novel and distinctive features of the invention resides in the provision of means for breaking up the intermittent action, incident to the operation of eductors, and to that end the interior walls A and B are each of a horizontally stepped formation thereby providing sections 8 and 9 and sections 10 and 11 lying opposite each other in the walls A and B which are equi-distantly spaced and arranged at different levels. Thus, the walls A and B are each constituted by adjoining sections lying in different planes, the difference in the level of the walls 8 and 10 and 9 and 11 being arrived at by experiment and usually found to be in inverse ratio to the velocity of efflux. The interior walls A and B are therefore of stepped formation and define the chambers C and D. These walls also carry the nozzle units E and F disposed eccentrically of the axes of the chambers C and D and likewise with reference to the axis of the delivery of the pipe 6.

As shown in the drawings, the sections 8 and 9 of walls A and B respectively carry the water nozzle 12 and eductor tube 13 of unit E, the same being spaced apart as indicated at 14 thereby to permit water issuing from the nozzle 12 into the tube 13 to draw ozone with it from the chamber D. The sections 10 and 11 of the walls A and B lying in a lower plane than the sections 8 and 9, also carry the water nozzle 15 and eductor tube 16 of the unit F, the said nozzle and tube being spaced to function in the same manner as the nozzle 12 and tube 13.

In the operation of the device, when water issues from the nozzles 12 and 15 located at different levels, ozone will be drawn from the chamber D into the relatively small eductor tubes 13 and 16, and discharged into the delivery pipe 6 of the device, and, due to the fact that the nozzle 12 is arranged in a plane above the nozzle 15, the gas entraining of the nozzles is drawn out of phase, thereby preventing the temporary intermittent formation of a vacuum and causing a continuous flow of ozone along with the water. That is to say, when the tube 13 is in the act of entraining gas from the chamber D, the tube 16 has not yet discharged its liquid, and vice-versa. When the tube 13 has performed its initial evacuation of liquid the ozone would ordinarily come to rest but such is not the case in the arrangement described because the tube 16 comes into play and entrains its quota of gas and therefore the withdrawal of gas with the water is insured uniformly and continuously throughout the operation of the device.

Also, as previously indicated the eductor tubes used are so small in comparison with the size pipe supplying them as to be considered in the nature of capillaries. It is an accepted physical fact that the nature of liquid efflux manifests itself in a series of ventral and nodal segments. This condition has been obtained in our eductor by the greatly reduced cross section of the orifices and tubes employed; and its capacity is, therefore, not limited to the space between the issuing jet and the walls of the containing body, but further includes the air spaces between the segments, making these segments a series of minor pistons which further adds to the positiveness of their action, and greatly increases the efficiency per unit of liquid employed, and permits of operation on pressures much lower than those required by the ordinary type of eductor; and since it entrains more gas, high velocities of efflux are not necessary.

From the foregoing it will be apparent that a novel and distinctive feature of the invention resides in regulating the nozzle devices at different levels to obtain the results pointed out and it will of course be understood that changes in the form, proportion and minor details of construction may be resorted to without departing from the spirit of the invention or scope of the appended claims.

We claim:—

1. An eductor for mixing a liquid and a gas including a casing having a stepped bottom wall and a stepped partition wall forming within the casing a liquid chamber and a gas chamber, a delivery member carried by the casing, and nozzle units respectively carried by correspondingly stepped portions of the bottom and partition walls and arranged in spaced registering relation.

2. An eductor for mixing a liquid and a gas including a casing having spaced interior walls forming a liquid chamber and a gas chamber, and registering nozzle units carried by said walls and spaced apart at different elevations in said gas chamber thereby to produce an out-of-phase gas entraining action in the gas chamber, and a delivery member carried by said casing.

3. An eductor including a casing having spaced interior stepped walls forming a liquid and a gas chamber, flaring nozzle units carried by one of said walls and tapering nozzle units carried by the other of said walls, said tapering nozzle units being in registry with the flaring nozzle units and the discharge mouths of the tapering nozzle units being spaced from the receiving mouths of the flaring nozzle units, and a tapering delivery member carried by said casing and having the wall thereof disposed obliquely to the path of discharge from said flaring nozzle units.

4. An eductor for mixing a liquid and a gas comprising a casing having an interior partition wall and a bottom wall forming a liquid chamber and a gas chamber, a liquid connection communicating with said liquid chamber, a gas connection communicating with said gas chamber, a delivery member carried by the lower end of said casing, and spaced registering nozzle elements respectively carried by the partition and bottom walls of said casing, and the said nozzle units having their adjacent ends spaced apart at different elevations within the gas chamber.

In testimony whereof we hereunto affix our signatures in the presence of two witnesses.

HARRY BUXTON HARTMAN.
FRANK EDWARD HARTMAN.

Witnesses:
MABEL FREEMAN,
MABEL ROSENSTEELE.